United States Patent [19]
Tornquist et al.

[11] Patent Number: 5,533,863
[45] Date of Patent: Jul. 9, 1996

[54] SELF POSITIONING NUT

[76] Inventors: Gerald E. Tornquist, 1053 E. Sandpiper, Tempe, Ariz. 85283; Paul E. Hruska, 417 S. Melissa Dr., Gilbert, Ariz. 85224

[21] Appl. No.: 38,593

[22] Filed: Mar. 26, 1993

[51] Int. Cl.$^6$ ............................................. F16B 29/00
[52] U.S. Cl. ........................... 415/229; 411/285; 411/917
[58] Field of Search ............................... 411/9, 285, 290, 411/291, 917; 415/229

[56] References Cited

U.S. PATENT DOCUMENTS

| | | | |
|---|---|---|---|
| 2,161,740 | 6/1939 | Eksergian | 301/35.62 |
| 2,320,030 | 5/1943 | Danforth | 411/290 |
| 4,169,630 | 10/1979 | Wagner | 301/35.62 |
| 4,571,133 | 2/1986 | Lindow | 411/11 |
| 5,024,453 | 6/1991 | Suggs | 411/544 |
| 5,192,049 | 3/1993 | Ridge | 251/214 |
| 5,316,319 | 5/1994 | Suggs | 411/917 |

FOREIGN PATENT DOCUMENTS 66520  10/1950  Netherlands ........................... 411/285

OTHER PUBLICATIONS

Assembly Engineering "Controlling Fastening Reliability And Costs" Jan. 1973.

*Primary Examiner*—Edward K. Look
*Assistant Examiner*—Michael S. Lee

[57] ABSTRACT

The present invention provides a compliant nut that can provide a more consistent compressive force to engine components by using a compliant section to absorb axial deflections. The present invention also provides a self centering feature that positions the nut upon compression, reduces thread stresses and prevents nut and shaft runout. The invention consists of an annular member having threads on the inner diameter for mating with a threaded shaft and having a conical portion extending axially and radially inward from the annular member for abutting engine components and the engine shaft. The nut includes a plurality of exciter teeth circumferentially disposed and extending radially from the annular member used to provide shaft speed signal for engine controls and a plurality of axial spline members extending axially from the annular member on the opposite face from conical section for mating with torque applying tools and locking mechanisms.

16 Claims, 2 Drawing Sheets

5,533,863

SELF POSITIONING NUT

TECHNICAL FIELD

This invention relates to a nut used on a shaft to apply a consistent compressive axial force on a plurality of components to position the components and to self position itself to the shaft.

BACKGROUND OF THE INVENTION

In many applications, nuts and bolts are used to apply compressive forces on multiple components, securing them in a stacked relation. The compressive force through the components is equal to the tensile force in the bolt which stretches proportionally to the bolt length. A problem occurs when the bolt is placed in a hot environment where it grows due to thermal expansion and relieves the compressive force. This problem can be further compounded by vibration which can help loosen the nut. This is particularly evident when the compressive force is minimal because the friction holding the nut in place is minimal. These detrimental conditions occur in gas turbine engines and other applications and must be overcome because securing the components is critical.

In gas turbine engines, a nut is often used on the end of a threaded shaft to secure and position engine components relative to the shaft. The shaft traditionally has a radial flange extending outward at one end to provide an abutting surface and threads for the nut at the opposite end. The engine components are stacked along the shaft such that the shaft extends through the center of the components. The nut is threaded to the shaft to apply a compressive force through the components which secures them in place relative to the shaft, and thus, pilots the components.

In some engines, such as the one in FIG. 1, the shaft is relatively short, and thus, has little axial deflection when pulled on by the nut. This presents several problems. First, different coefficients of thermal expansion can make the thermal growth of the shaft greater than that of the engine components during hot, operating conditions. Second, the engine components are subject to dynamic radial forces which results in a Poisson axial contraction in the components. These phenomena tend to relieve the securing force and pilot of the engine components. Also, a large axial force is required to maintain the engine components in compression which can create high stresses in the nut threads. Because the shaft and nut threads are at an angle other than 90 degrees to the nut and shaft centerline, the compressive load tends to be unevenly distributed circumferentially on the engine components and the threads tend to axially align at 90 degrees to the centerline. Another serious problem is the entrapment of debris which can cause runout in both the nut and shaft end such that the nut and shaft end are no longer centered to the engine centerline.

Accordingly, a need exists for a nut that can apply a consistent compressive force on piloted components to allow for shaft and engine component axial deflection mismatch and can reduce thread stresses. A need also exists for a nut that can apply a circumferentially uniform compressive force to the engine components and will not create nut and shaft runout and will self center the nut in the event of entrapped debris.

SUMMARY OF THE INVENTION

An object of the invention is to provide a nut which will provide a more uniform compressive load through a plurality of components stacked upon a shaft when the components and the shaft have axial deflection mismatch.

Another object of the invention is to provide a nut which will self center itself to the shaft and prevent shaft and nut runout.

Still another object of the invention is to provide a nut which will reduce maximum thread stresses.

Still another object of the present invention is to provide a nut that can be used to obtain an engine speed signal.

The present invention meets the above mentioned objects by providing a compliant nut that can provide a more consistent compressive force to engine components through a compliant section which absorbs axial deflection mismatch. The present invention also provides a self centering feature that positions the nut upon compression, reduces thread stresses and prevents nut and shaft runout. More particularly, the invention is an annular member having threads on the inner diameter for mating with a threaded shaft and having a conical portion extending axially and radially inward from the annular member for abutting engine components and the engine shaft. The conical portion is compliant in the axial direction, and thus, deflects when compressed. Also, the conical portion inner surface deflects radially inward to contact the shaft when the nut is compressed which centers the nut on the shaft, reduces thread stresses and prevents nut and shaft runout.

Other features present in the compliant nut include a plurality of exciter teeth circumferentially disposed and extending radially from the annular member used to provide a shaft speed signal for engine controls and a plurality of axial spline members extending axially from the annular member on the opposite face from the conical section for mating with torque applying tools and locking mechanisms.

DETAILED DESCRIPTION OF THE PREFERRED EMBODIMENT

The following description of the preferred embodiment of the present invention refers to a section of a conventional gas turbine engine that includes a compressor, a combuster and a turbine (all not shown) in fluid communication for providing shaft power to a load compressor 12 and output power at the gearbox shaft 20. Air is compressed in the compressor, then combusted in the combustor with fuel and then expanded over the turbine to provide the shaft power. The shaft power is transferred to the load compressor 12 and shaft 20 through engine shaft 18.

Figure 1:
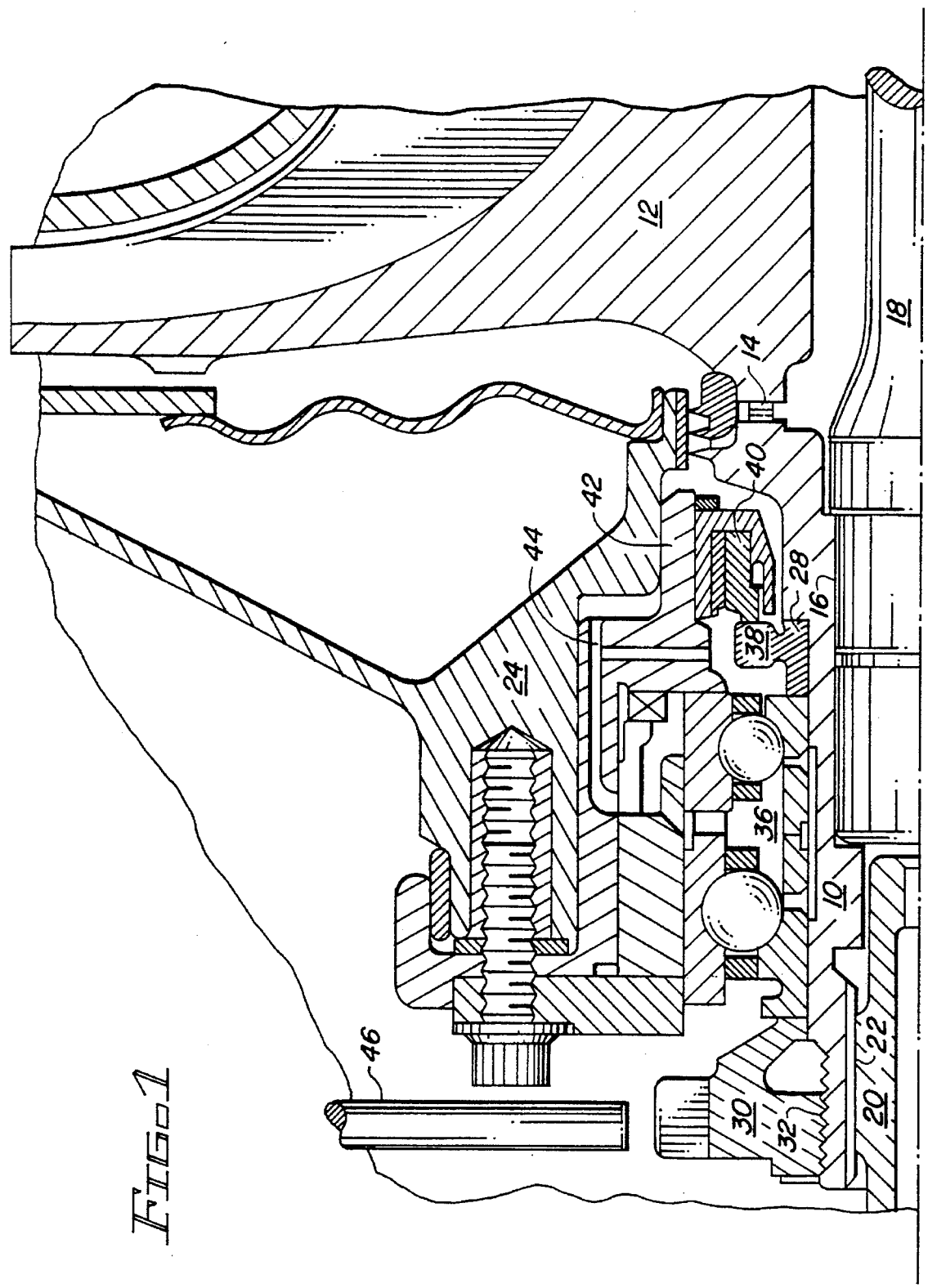
FIG. 1 is a cross section of a gas turbine engine coupling shaft utilizing a nut according to the present invention.

FIG. 1 shows a rotating coupling shaft 10 coupled at one axial end to the load compressor 12 through a curvic coupling 14 and to the engine shaft 18 through threads 16 and is coupled at the other axial end to a gearbox shaft 20 through spline 22. The coupling shaft 10 is radially positioned in a gearbox housing 24 through bearings 36. The bearings 36 require lubrication which is provided through passages 44 in a support member 42. A seal rotor 38 and carbon face seal 40 seal the lubricant from the load compressor 12. The carbon face seal 40 is an annular member with a axially flat surface for abutting the seal rotor 38 and is positioned by support member 42. The seal rotor 38 and bearings 36 are axially positioned by abutting against surface 28 on shaft 10 through a compressive force applied by the nut 30. The nut 30 is coupled to the shaft 10 through threads 32, and when assembled, secures the engine components 36 and 38 through a force of approximately 3650 lb in the preferred embodiment.

Figure 2:
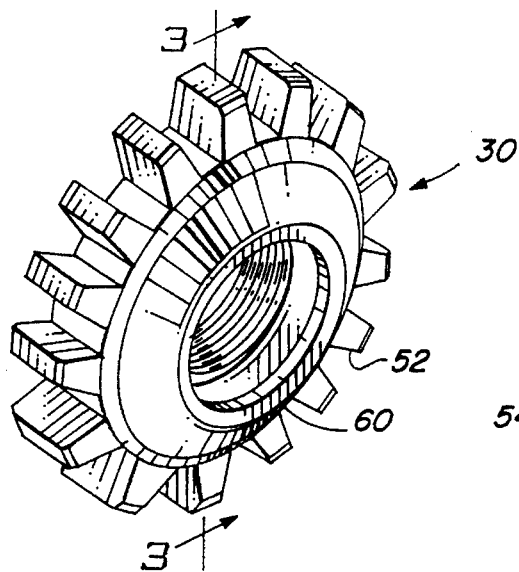
FIG. 2 is a perspective view of the nut, looking toward the conical portion.
Figure 4:
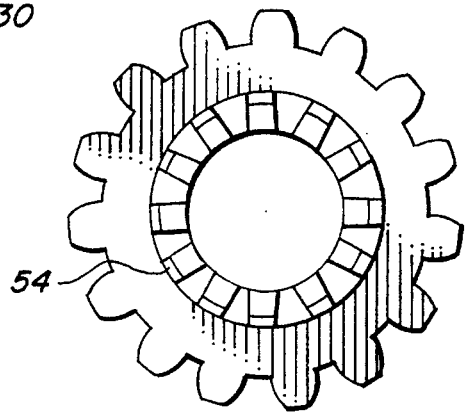
FIG. 4 is a side view of the back side of the nut.
Figure 3:
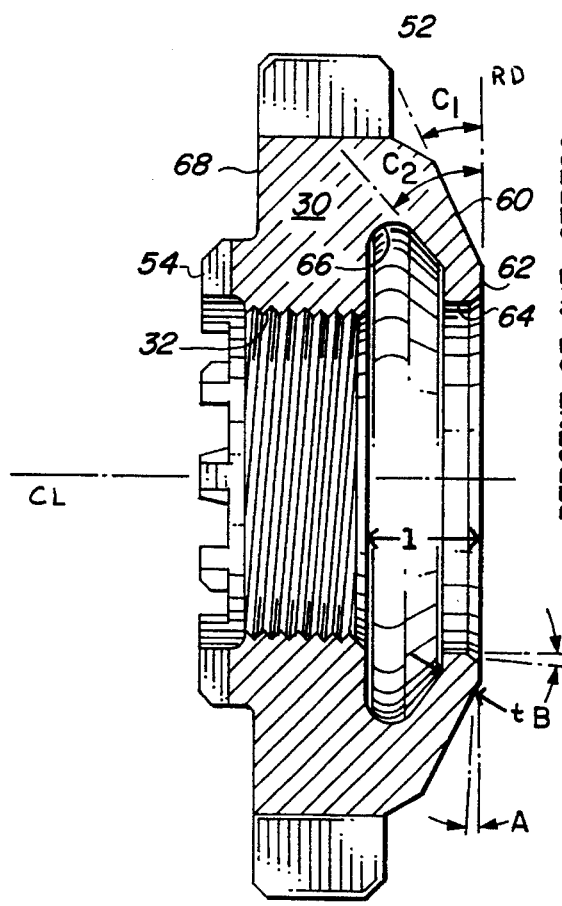
FIG. 3 is a cross section of the nut.

As shown in FIGS. 2–4, the nut 30 is comprised of an annular member portion 68 with the threads 32 on the inner diameter. A plurality of axial splines 54 are located circumferentially on the annular member 68 to mate with a tool that torques the nut 30 on the shaft 10 for assembly. A plurality of exciter teeth 52 are circumferentially disposed about the outer surface of the annular member 68 and extend perpendicularly therefrom. As seen in FIG. 1, a sensing device 46 extends radially in from the engine outer housing (not shown) and uses the exciter teeth 52 to measure the engine rotational speed. By using the nut 30 to provide the engine speed, the controls can be moved to the gearbox housing 24 for better accessibility and component temperature control.

The nut 30 also has an annular compliant section 60 which is conically shaped and extends axially and radially inward toward the engine centerline from the annular member 68 so as to form an inverse V shape therewith and forming a circumferential channel 66. The compliant section 60 has an axially flat end with surface 62 at the radially inner end for contacting the engine components 36 and 38 and applying the compressive force thereon. When the nut 30 is threaded onto the shaft, the compliant section 60 acts as a spring and deflects axially toward the annular member 68 more than the shaft 10 stretches. Thus, the difference in deflection of the engine components 36 and 38 and the shaft 10 during engine operation can be reacted through deflection in the compliant section 60 and the compressive force exerted on the engine components 36 and 38 will remain proportional to the spring rate of the compliant section 60. In the preferred embodiment, the thickness t of the compliant portion 60 is approximately ⅓ of its axial extension 1. This thickness provides a sufficiently stiff compliant section 60 to apply the compressive force desired and provides a small radial deflection to prevent gouging of the shaft 10. The stiffness or spring rate of the compliant portion 60 can be tailored by simply thinning or thickening the compliant portion 60.

The compliant portion 60 also has an inner surface 64 that encircles the shaft 10 with little or no clearance therebetween before any load has been applied. In the preferred embodiment, the inner surface 64 is sized with a line-to-line clearance with the shaft 10, but greater compliancy in the compliant portion 60 would require greater clearance between the inner surface 64 and the shaft 10 to prevent gouging into the shaft 10. When the nut 30 is torqued onto the shaft 10, the inner surface 64 deflects radially inward to contact the shaft 10. By clamping the inner surface 64 on the shaft 10, the nut 30 is self centered on the shaft and any misaligning moment, caused by the nut threads 32 or any entrapped debris, is reacted through the radial loads in the inner surface 64 rather than through the axial loads in surface 62 which would create runout in the nut 30 and shaft 10.

Figure 5:
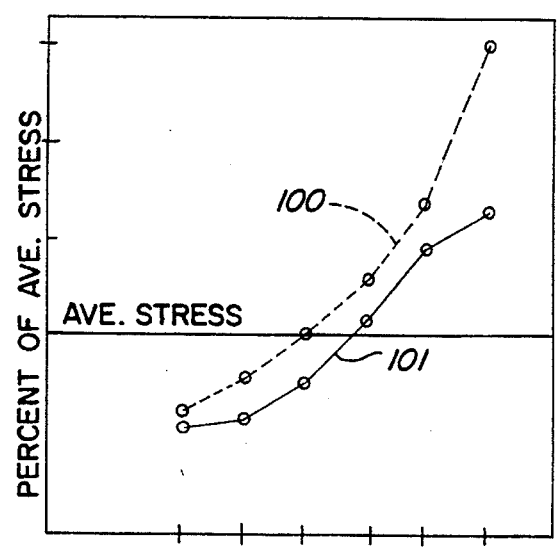
FIG. 5 is a graphical representation of the percent of average thread stress for a nut according to the present invention compared to a conventional nut.

The clamping of the inner surface 64 also creates a radially outward force that is transferred through the compliant section 60 to the annular member 68. This force pulls radially outward on the annular member 68, relieving the compressive force in the first few threads of threads 32 as illustrated by FIG. 5. FIG. 5 graphically depicts the percent of average stress for stresses in a conventional nut, line 100, and stresses in the present invention nut, line 101. A conventional nut is used in the comparison as the closest prior art the applicants are presently aware of. The stresses were calculated for the conventional nut using data from "Controlling Fastening Reliability and Cost", *Assembly Engineering*, January, 1973, p 27 and the stresses in the nut 30 were calculated using a finite element model of the nut. Each point on the lines depicts the percent of average stress for a thread root where the first thread root is represented by the furthest point to the right. FIG. 5 indicates that the present invention tends to decrease the stresses in the first few thread roots by more evenly distributing the compressive load over the threads.

In FIG. 3, the conical angles $C_1$ and $C_2$ in the preferred embodiment are approximately 30 and 44 degrees respectively from the radial direction RD which is perpendicular to the nut and engine centerline. As one skilled in the art can appreciate, as the angles $C_1$ and $C_2$ approach 90 degrees, the axial stiffness of the compliant section increases and as the angles approach 0 degrees, the axial stiffness of the compliant section 60 decreases as long as the compliant section 60 is spaced apart from the annular member 68. Conversely, as the angles $C_1$ and $C_2$ approach 0 degrees, radial stiffness increases so that the radial force through the inner surface 64 to center the nut 30 becomes increasingly stiffer. Thus, angles $C_1$ and $C_2$ must be less than 90 degrees and are preferably between about 45 degrees and 0 degrees.

Preferably, surface 62 has a slight angle A as shown in FIG. 3 that is less than about 1 degree. The angle A allows the surface 62 to align flat against the compressed engine components, namely the bearing 36 inner race. Similarly, surface 64 also has a slight angle B that is less than about 1 degree so that the surface will lay flat against the shaft 10 upon nut compression. Both angles A and B should be changed inversely proportionally to changes in the stiffness of the compliant section 60.

The nut 30 is preferably made from stainless steel 17-4 which provides good material properties through the gearbox operating temperatures of less than 0 to 400 degrees Fahrenheit. Of course, other stainless steels or A286 could be used in this application and Inco 718 could be used for hot applications. The nut 30 is preferably manufactured by bottle boring such that material is removed between the annular ring 68 and the compliant section 60 creating the annular channel therebetween. However, alternative processes are available, such as casting an integral nut 30 or bonding a compliant section 60 to an annular member 68.

As one skilled in the art can appreciate, the compliant section 60 could be comprised of a conical section extending radially outward if the engine components had larger diameters. While this would provide the desired axial compliance, it would not center the nut to the shaft or relieve the thread stresses as the preferred embodiment does.

Other modifications and alterations to the above described preferred embodiment will be apparent to those skilled in the art. Accordingly, this description of the invention should be considered exemplary in nature and not as limiting to the scope and spirit of the invention which should be determined from the following claims.

What is claimed is:

1. A nut for applying a compressive force to one or more components mounted on a shaft, having a centerline defining an axial direction, to position the components against a fixed surface, comprising:

an annular member having means for coupling the annular member to said shaft on the inner diameter of said annular member; and a compliant member integral with said annular member and having a first surface for transmitting said compressive force to said components, said compliant member having a conical portion extending axially from said annular member to said first surface, said conical portion also extending inward from said annular member to a second surface concentric with said annular member and which is configured to deflect inward to contact said shaft when said first surface is transmitting said compressive force, whereby said nut is centered to said shaft.

2. The nut of claim 1 wherein said annular member defines a radial direction and said conical portion extends inward at a first angle of less than 90 degrees from said radial direction.

3. The nut of claim 2 wherein said first angle is approximately 45 degrees.

4. The nut of claim 1 wherein said second surface has a first diameter and said shaft has a second diameter, said first diameter being greater than or equal to said second diameter, before said compressive force is transmitted through said first surface.

5. The nut of claim 4 wherein said second surface has a second angle of less than 1 degree from said axial direction.

6. The nut of claim 1 wherein said first surface has a third angle of less than 1 degree from said radial direction.

7. A nut for applying a compressive force to one or more components mounted on a shaft to position the components against a fixed surface of said shaft, comprising:

an annular portion having a plurality of threads on the inner diameter for securing said nut to said shaft;

a centering member extending inward from said annular portion to contact said shaft and center said nut to said shaft; and a spring portion having a first axial end integral with said annular portion, a conical portion extending from said first axial end to a second axial end, said second axial end deflecting toward said annular portion upon application of said compressive force.

8. The nut of claim 7 further comprising a plurality of exciter teeth members circumferentially disposed on and radially extending from said annular portion for providing a nut rotational speed signal.

9. The nut of claim 8 further comprising a plurality of spline members circumferentially disposed about and axially extending from said annular portion opposite said spring for mating with torque applying tools.

10. The nut of claim 7 wherein said centering member is said spring.

11. A gas turbine engine comprising:

a shaft with a radial flange at one end and threads at the opposite end;

a plurality of engine components concentric with said shaft and axially stacked on said shaft against said radial flange; and a nut for piloting said plurality of engine components to said shaft, said nut having an annular body having threads on its inner surface for mating with said shaft threads and a flat plate extending at an angle from said annular body to said engine components so that said annular body and said flat plate form an inverted V shape and define a circumferential channel therebetween.

12. The engine of claim 11 wherein said flat plate has an axial surface approximately parallel to said annular body and at the opposite end of said flat plate from said annular body, for abutting said plurality of engine components.

13. The engine of claim 12 wherein said flat plate has a radial surface at the inner end of said flat plate for abutting said shaft.

14. The engine of claim 13 wherein said flat plate has an end portion extending at an angle from said flat plate so that said end portion is substantially parallel to said annular body.

15. The engine of claim 14 wherein said nut further comprises a plurality of exciter teeth members circumferentially disposed about and radially extending from said annular body to provide an engine speed signal.

16. The engine of claim 15 wherein said nut further comprises a plurality of spline members circumferentially disposed and axially extending from said annular body, opposite said flat plate, for mating with a tool to apply torque to said nut.

* * * * *

UNITED STATES PATENT AND TRADEMARK OFFICE
CERTIFICATE OF CORRECTION

PATENT NO. : 5,533,863

DATED : July 9, 1996

INVENTOR(S) : Tornquist, et al.

It is certified that error appears in the above-identified patent and that said Letters Patent is hereby corrected as shown below:

On the title page, item [73], insert,

Assignee:    AlliedSignal Inc., Morris Township, N.J.

Attorney, Agent or Firm:    Jerry J. Holden; James W. McFarland

Signed and Sealed this

Fifth Day of November, 1996

Attest:

BRUCE LEHMAN

Attesting Officer            Commissioner of Patents and Trademarks